US008661420B2

(12) United States Patent
Smithline (10) Patent No.: US 8,661,420 B2
(45) Date of Patent: Feb. 25, 2014

(54) SYSTEM AND METHOD FOR RUNTIME INTERFACE VERSIONING

(75) Inventor: Neil Smithline, Newton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1996 days.

(21) Appl. No.: 11/195,991

(22) Filed: Aug. 3, 2005

(65) Prior Publication Data

US 2006/0031855 A1 Feb. 9, 2006

Related U.S. Application Data

(60) Provisional application No. 60/598,315, filed on Aug. 3, 2004.

(51) Int. Cl.
*G06F 9/45* (2006.01)
*G06F 9/44* (2006.01)

(52) U.S. Cl.
USPC ............................ 717/138; 717/168; 719/328

(58) Field of Classification Search
USPC ................................................. 717/168, 138
See application file for complete search history.

(56) References Cited

U.S. PATENT DOCUMENTS

| 6,490,624 | B1 | 12/2002 | Sampson et al. |
| 6,618,806 | B1 | 9/2003 | Brown et al. |
| 6,651,168 | B1 | 11/2003 | Kao et al. |
| 6,668,327 | B1 | 12/2003 | Prabandham et al. |
| 6,836,845 | B1 | 12/2004 | Lennie et al. |
| 6,842,264 | B1 * | 1/2005 | Leyva et al. ................. 358/1.15 |
| 6,877,095 | B1 | 4/2005 | Allen |
| 6,944,761 | B2 | 9/2005 | Wood et al. |
| 6,976,076 | B2 | 12/2005 | Shrader et al. |
| 6,985,953 | B1 | 1/2006 | Sandhu et al. |
| 7,017,051 | B2 * | 3/2006 | Patrick ............................ 726/12 |
| 7,047,525 | B2 * | 5/2006 | Prunty et al. .................. 717/137 |
| 7,089,584 | B1 | 8/2006 | Sharma |
| 7,260,816 | B2 * | 8/2007 | Kar et al. ....................... 717/136 |
| 7,305,669 | B2 * | 12/2007 | Roush ........................... 717/170 |
| 2002/0188869 | A1 | 12/2002 | Patrick |
| 2003/0005118 | A1 | 1/2003 | Williams |
| 2003/0005331 | A1 | 1/2003 | Williams |
| 2003/0037237 | A1 | 2/2003 | Baldwin et al. |
| 2003/0097574 | A1 | 5/2003 | Upton |
| 2003/0177388 | A1 | 9/2003 | Botz et al. |
| 2004/0015889 | A1 * | 1/2004 | Todd et al. ..................... 717/137 |

OTHER PUBLICATIONS

Lai, C., et al. "User Authentication and Authorization in the JAVA (TM) Platform," Proceedings of the 15th Annual Computer Security Applications Conference, Phoenix, Arizona, Dec. 1999, 10 pages.

(Continued)

*Primary Examiner* — Li B Zhen
*Assistant Examiner* — Hang Pan
(74) *Attorney, Agent, or Firm* — Meyer IP Law Group (57) ABSTRACT

The present invention provides methods, machine readable memories and systems for versioning plugin adapters for servers so as to allow legacy versions of software plugins to function when the interfaces configured to accept the plugins are upgraded. An adapter resides between a plugin interface and the plugin module and converts requests designed for a current or new version to requests designed for legacy versions. In some embodiments, the interface elements are designed to extend and adapt the functionality of a security apparatus by enabling the security apparatus to utilize third party security providers.

18 Claims, 4 Drawing Sheets

(56) References Cited

OTHER PUBLICATIONS

Samar, V., et al. "Making Login Services Independent of Authentication Technologies," 3rd ACM Conference on Computer and Communications Security, Mar. 1996, 10 pages.

"BEA WebLogic Server 7.0—Creating Custom Authentication Providers," BEA Systems, May 2002, Retrieved from the Internet on Jun. 11, 2009: <URL: http://web.archive.org/web/20020528085707/edocs.bea.com/wls/docs70/dvspisec/atn.html>.

"WebLogic Server 6.1—Introduction to WebLogic Security," BEA Systems, 2001, Retrieved from the Internet on Jun. 11, 2009: <URL: http://edocs.bea.com/wls/docs61/security/intro.html>.

* cited by examiner

SYSTEM AND METHOD FOR RUNTIME INTERFACE VERSIONING

CLAIM OF PRIORITY

The present application claims priority to the following provisional application, the contents of which are incorporated by reference herein in their entirety:

U.S. Provisional Patent Application No. 60/598,315, entitled SYSTEM AND METHOD FOR RUNTIME INTERFACE VERSIONING, by Neil Smithline, filed on Aug. 3, 2004.

CROSS REFERENCE TO RELATED APPLICATIONS

The present application relates to the following application, the contents of which are hereby incorporated by reference in their entirety:

U.S. patent application Ser. No. 10/373,532 entitled SYSTEM AND METHOD FOR ENTERPRISE AUTHENTICATION, by Paul Patrick, filed on Feb. 24, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to systems, methods and computer readable media for upgrading servers. The present invention relates more particularly to enabling interoperability between related software products that are designed to work with different versions of servers.

BACKGROUND OF THE INVENTION

Since its inception in 1995, the Java™ programming language has become increasingly popular. (Java™ is a trademark of Sun Microsystems, Inc.) Java, which is an interpreted language, enabled the creation of applications that could be run on a wide variety of platforms. This ability to function across a variety of different client platforms, i.e. platform independence, and Java's relatively easy implementation of network applications has resulted in its use in endeavors as basic as personal webpages to endeavors as complex as large business-to-business enterprise systems.

As Java has become more commonplace, a wide variety of tools and development platforms have been created to assist developers in the creation and implementation of applications and portals using Java or other languages supporting platform independence.

Many of such applications and portals are based around one or more servers that provide, inter alia, application support and control access to resources. It is often desirable to enable third parties to produce custom software modules or plugins that can be inserted into such servers to perform functions that would otherwise be performed by the base software of the server. Server architectures can be designed to enable easy development of plugins for certain features such as security.

However, as the interfaces through which the plugins interact with the server are upgraded, plugins that were designed for previous versions of the interfaces may be rendered incompatible. The process of upgrading the plugins can be time consuming and expensive.

What is needed is an improved interface that allows legacy plugin products to be used with newer plugin interfaces.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for versioning plugin adapters for servers. These mechanisms and methods can enable embodiments to provide legacy versions of software plugins the capability to function when the interfaces configured to accept the plugins are upgraded. The ability of embodiments to provide plugins with the capability to function when the interfaces configured to accept the plugins are upgraded can enable easier migrations to new versions, extended use from legacy plugins and so forth.

In an embodiment, a method for utilizing a plugin product for a server is provided. The plugin product can have an old interface version. One embodiment of the method includes accepting a request directed towards a new interface version of the plugin. The request directed towards the new interface version is converted to a request directed towards the old interface version. The request directed towards the old interface version is transmitted to the plugin.

In some embodiments, the request may be a request directed to a security provider. In various embodiments, accepting a request to a security provider accessible via the plugin can include accepting a request for any of: an authentication system, an identity assertion system, an authorization system, and an auditing system.

While the present invention is described with reference to an embodiment in which security providers create executable adapter programs written in the Java™ programming language that are executed in conjunction with plugin interfaces adapted to work with legacy versions of software, the present invention is not limited to security providers, nor to the Java™ programming language and may be practiced using other programming languages, i.e., JSP and the like without departing from the scope of the embodiments claimed. (Java™ is a trademark of Sun Microsystems, Inc.) In one embodiment, the servers utilize an application server product, such as WebLogic® Server by BEA systems of San Jose, Calif.

Figure 1:
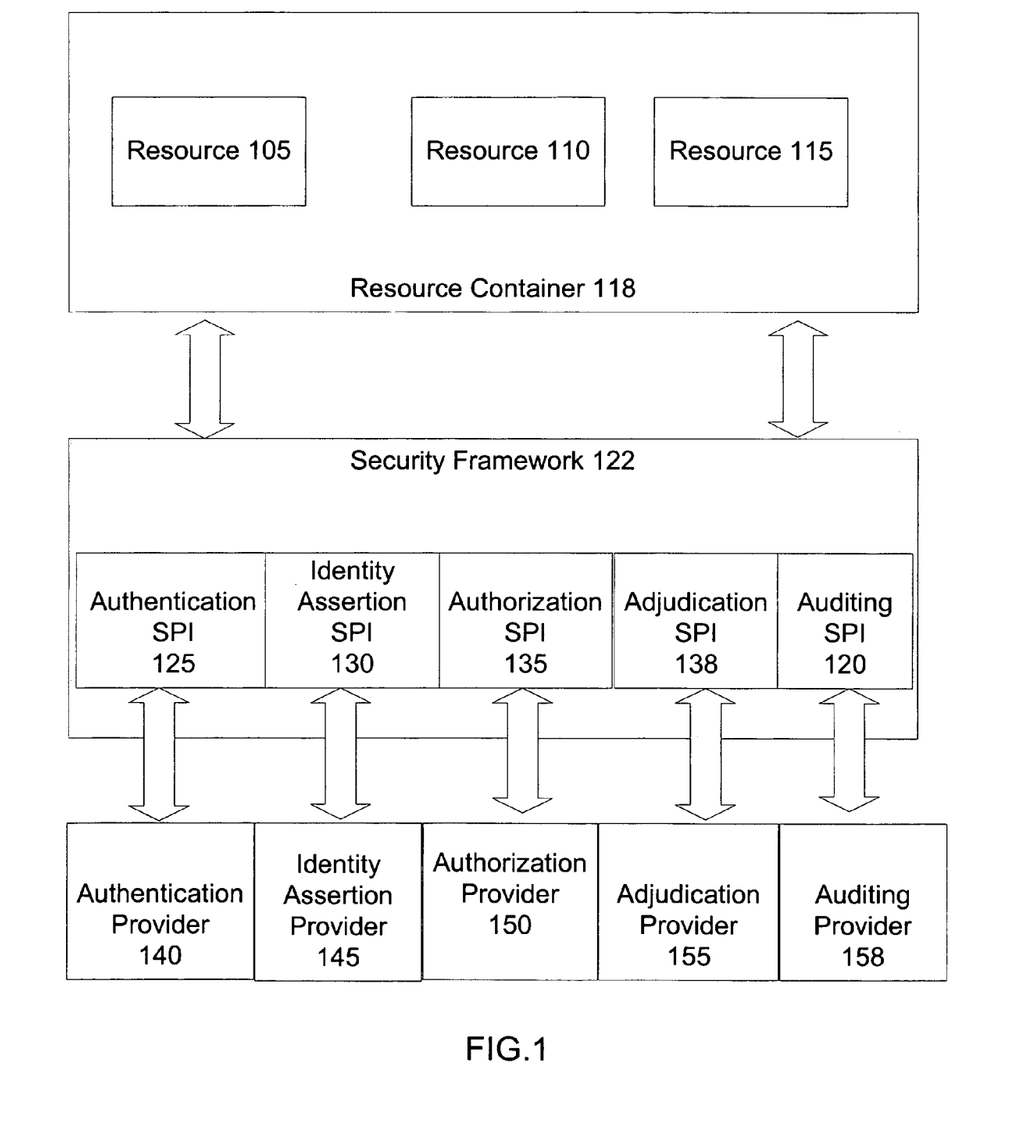
FIG. 1 is a block diagram illustrating one embodiment of a security framework.

FIG. 1 is a block diagram illustrating one embodiment of a security framework of a server. In one embodiment, the server is a Java server. The security framework includes a resource container 118 containing resources 105, 110, and 115. Preferably, the resource container contains all of the resources required by a particular activity or particular group of activities. The resources include information and programs that will be utilized within the activities. The resource container is configured to provide the resources in response to an approved request from a security framework 122.

The security framework 122 includes multiple Service Provider Interfaces (SPIs). These interfaces may also be referred to as Security Provider Interfaces. The SPIs are configured to access security providers that provide security verification services for users attempting access the resources 105, 110, and 115.

The SPIs include an authentication SPI 125. The authentication SPI 125 is configured to utilize an external authentication provider 140 to verify a user's credentials. The authentication provider 140 accepts credentials from a user and uses those credentials to verify the user's identity. The authentication provider 140, like the identity assertion provider 145, authorization provider 150, and adjudication provider 155 is a software plugin that interacts with the security framework 122 through the SPIs.

The credentials utilized by the authentication provider can include usernames and passwords, secure tokens, biometric data, secure hardware keys, or any other credentials that can be used to verify a user identity. The authentication provider returns to the security framework 122 a value indicating whether the user has been successfully authenticated and information about the user (e.g. what groups the user belongs to).

Another type of SPI is an identity assertion SPI 130. The identity assertion SPI 130 is configured to accept identity assertions for users from external systems such as the identity assertion provider 145. The identity assertion SPI can be configured for multiple provider types, including multiple tokens and certificates for verifying a user's identity. The identity assertion SPI provides a response to an authentication request indicating whether a user is permitted to access the resource.

An authorization SPI 135 is configured to use an authorization provider 150 to determine whether a user is permitted to access a resource. Once a user's identity has been established through the authentication provider 140 or the identity assertion provider, the authorization provider 150 determines whether the user as currently identified is permitted to access the resource.

The security framework also includes an auditing SPI 120. In some embodiments, the various SPIs can utilize multiple providers. The auditing SPI 120 utilizes an auditing provider 158 to record the various responses from the differing security providers. An adjudication SPI 138 and adjudication provider 155 are configured to resolve a conflict when one exists. For example, in some embodiments, the authentication SPI 125 can utilize multiple authorization providers 150. If some return a successful authentication and some return an unsuccessful authentication in response to an authentication request, the adjudication provider 155 determines whether the user should be authenticated. In some embodiments, an administrator can set adjudication criteria indicating how conflicts are resolved. For example, the criteria could be set such that a successful authentication from any of the providers, or all of the providers is needed for a user to be considered authenticated.

In some embodiments, the security provider also includes role mapping SPIs, credential mapping SPIs and other SPIs for outsourcing security functions to plugins.

Figure 2:
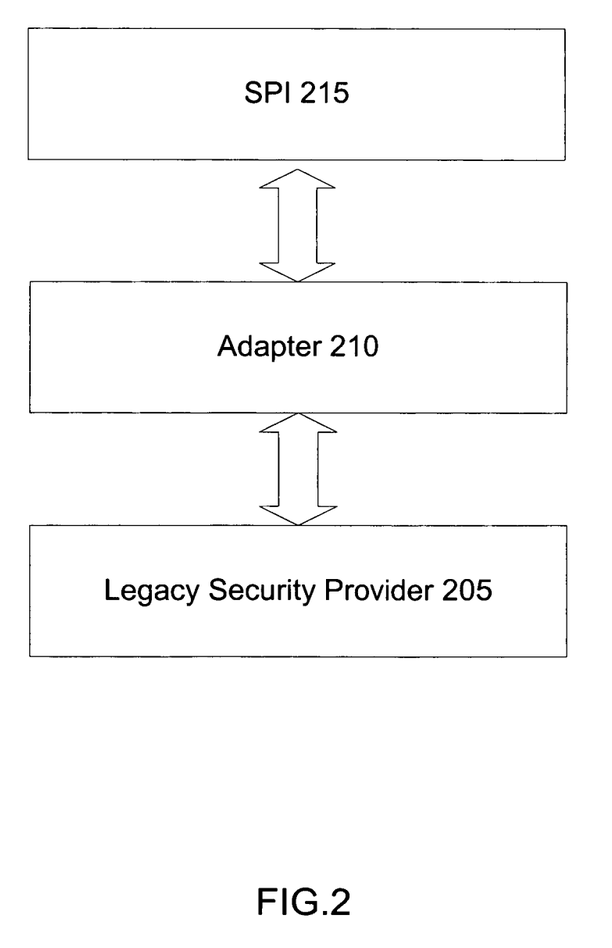
FIG. 2 is a block diagram illustrating one embodiment of an interaction among a security provider interface, an adapter, and a security provider.

FIG. 2 is a block diagram illustrating one embodiment of an interaction among a security provider interface 215, an adapter 210, and a security provider 205 in an embodiment. The legacy security provider 205 is one of the service providers 140, 145, 150, 155 illustrated in FIG. 1. The SPI 215 is one of the SPIs 125, 130, 135, 138, 158 illustrated in FIG. 1.

The SPI 215 has a set of interface parameters governing how it will interact with the security provider 205. These parameters indicate the formatting and content of data transmitted to and received from the security provider 205. As new versions of the SPI are released, these interface parameters can change, thus requiring that the security provider 205 be updated to interact with the SPIs correctly.

However, security providers are often difficult to update, requiring considerable amounts of time and expense. Thus, legacy providers 205 often remain in place long after the SPI 215 is updated. Thus, an adapter 210 is used to translate information passed between the SPI 215 and the security provider 205. The adapter 210 receives communications from the SPI 215 configured for a new version of the provider 205, and translates the communications into communications configured for the legacy version of the provider 215. The adapter also receives communications configured for the legacy version of the SPI and converts the communications to communications designed for the new version of the SPI.

In some embodiments, the adapter 210 "wraps" the service provider, generating a new service provider object that interacts with SPI as a provider 215, but is capable of converting requests between versions.

Figure 3:
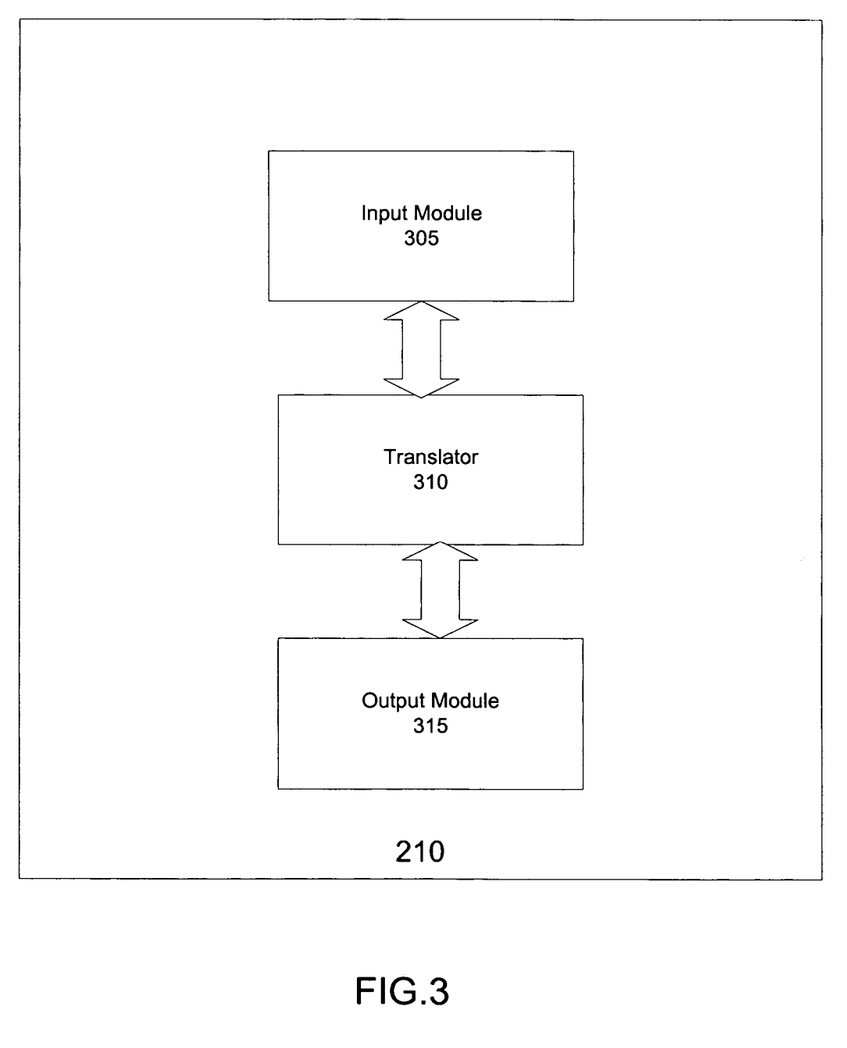
FIG. 3 is a block diagram illustrating another high-level view of an adapter in an embodiment.

FIG. 3 is a block diagram illustrating another high-level view of an adapter in an embodiment. The adapter includes an input module 305 that is configured to receive communications from either the SPI 205 or the security provider. These communications are passed to a translator 310.

The translator 310 receives the communications and according to the type of communications, translates them as necessary. The translator 310 preferably stores information indicating a version of the SPI 205 and the security provider 215. In some embodiments, the translator can translate between multiple differing versions of the SPI and providers. When the translator 310 receives input from the SPI 205 or the provider 215 through the input module, it converts it to output that is configured for the type of the destination and passes it to an output module 315.

While in the present embodiment, the adapter 210 is used to bridge communications between legacy security providers and new SPIs, in alternate embodiments, adapters can be used to enable any type of plugin having similar compatibility issues.

Disclosed below is computer code for implementing an adapter for an authorization provider in an embodiment.

```
package weblogic.security.service.adapters;
import javax.security.auth.login.AppConfigurationEntry;
import weblogic.security.spi.AuthenticationProvider;
import weblogic.security.spi.AuthenticationProviderV2;
import weblogic.security.spi.ChallengeIdentityAsserter;
import weblogic.security.spi.ChallengeIdentityAsserterV2;
import weblogic.security.spi.IdentityAsserter;
import weblogic.security.spi.IdentityAsserterV2;
import weblogic.security.spi.PrincipalValidator;
public class AuthenticationProviderV1Adapter extends SecurityProviderV1Adapter
implements AuthenticationProviderV2 {
public AuthenticationProviderV1Adapter(AuthenticationProvider provider) {
base = provider;
}
public AppConfigurationEntry getLoginModuleConfiguration() {
AuthenticationProvider atn = (AuthenticationProvider) base;
return atn.getLoginModuleConfiguration();
public AppConfigurationEntry getAssertionModuleConfiguration() {
AuthenticationProvider atn = (AuthenticationProvider) base;
return atn.getAssertionModuleConfiguration();
}
public PrincipalValidator getPrincipalValidator() {
AuthenticationProvider atn = (AuthenticationProvider) base;
return atn.getPrincipalValidator();
}
public IdentityAsserterV2 getIdentityAsserter() {
AuthenticationProvider atn = (AuthenticationProvider) base;
IdentityAsserter asserter = atn.getIdentityAsserter();
if (asserter instanceof ChallengeIdentityAsserter) {
return new ChallengeIdentityAsserterV1Adapter((ChallengeIdentityAsserter)asserter);
}
else {
return new IdentityAsserterV1Adapter(asserter);
}
}
}
```

Figure 4:
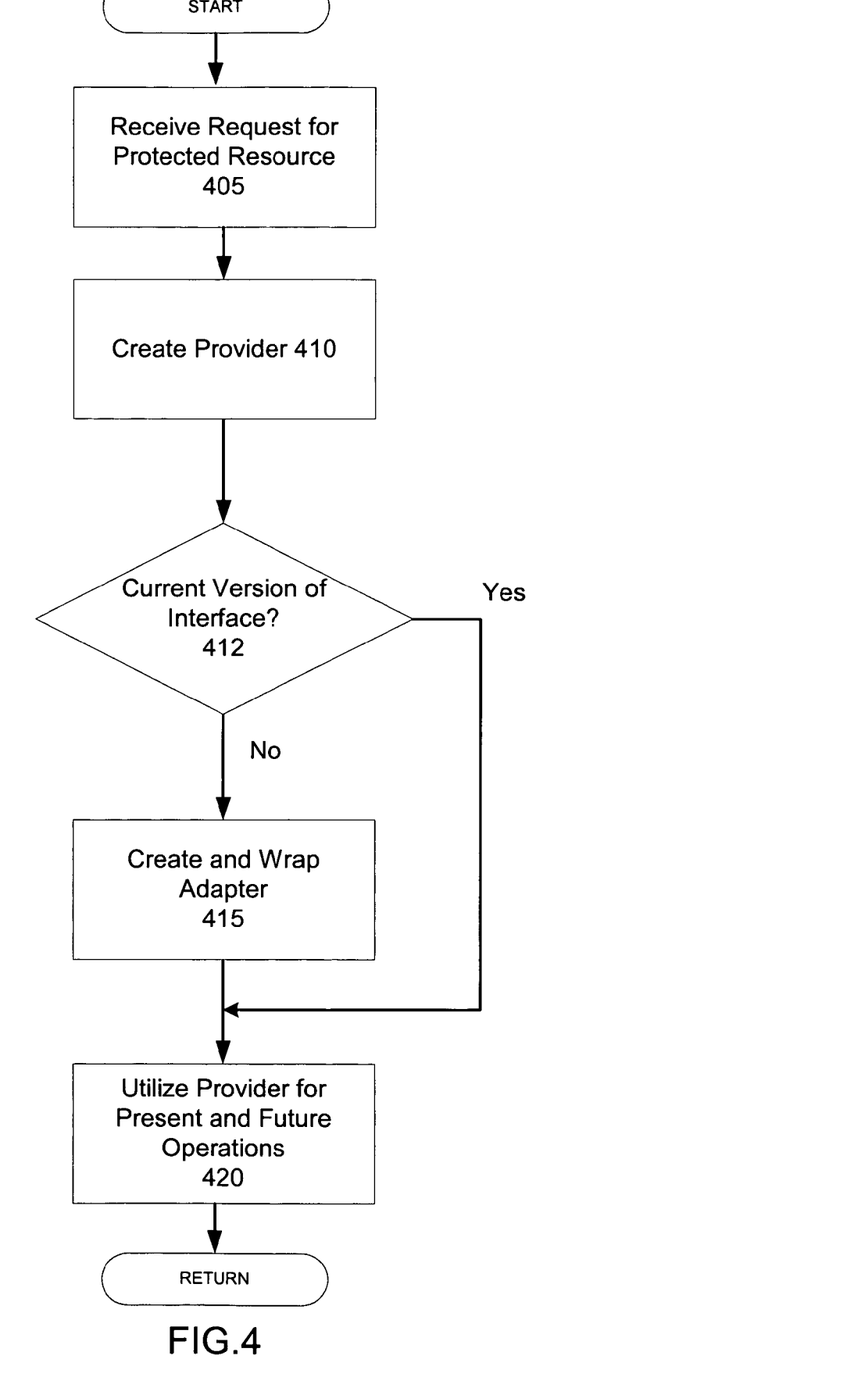
FIG. 4 is a flow chart illustrating one embodiment of a process for utilizing a security provider.

FIG. 4 is a flow chart illustrating one embodiment of a process for utilizing a security provider. In block (405) the security framework 122 receives a request for a protected resource. In block (410) the security framework creates a provider object from the security provider. Creating a provider object can entail generating an object to perform the provider's tasks. In block (412), the system determines whether the provider object uses a current version of the interface or a legacy version. If the provider uses the current interface version, the process jumps to block (420), where the existing provider is utilized as the provider object. If the provider uses the legacy interface, the process moves to block (415), in which it wraps the existing provider around the adapter.

In some embodiments, block (415) is implemented by the code disclosed below:
SecurityProvider provider=
AdapterFactory.getAuthenticationProvider(mbean, auditor);

The code disclosed above utilizes an adapter factory to produce an adapter module instance, that with the SPI, communicates with the service provider. The security framework 122 does not need to be aware of any conversion steps being performed by the adapter, instead only receiving notification from the SPI of the response (i.e., successful/unsuccessful authentication/authorization etc.).

In block (420), the security provider is utilized to return an authentication/authorization response. If the security provider and adapter have the same version, the adapter does not perform any conversion. The type of conversion depends on the level of change between the two versions of the plugin interface.

For example, in the case of an improved identity assertion SPI, an original version of a method used to access the identity assertion provider might call the identity assertion provider with one argument, whereas the improved SPI calls the provider with two arguments. The adapter receives the two-argument call from the SPI, and makes a call to the provider with a single argument. The new wrapped security provider is used for future operations.

In some embodiments, the creation of the provider object and wrapping of the adapter occurs during an initiation/bootup/deployment stage rather than when a specific request is received.

It should also be understood that while a security provider is discussed as an exemplary embodiment, the embodiments discussed above can be applied to any type of software plugin.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A method for translating between different versions of a server interface, utilizing a plugin framework for a server operating on one or more micro-processors, the method comprising:
    providing, at the server, the plugin framework which includes a plurality of interfaces, wherein each interface is associated with a different type of service provider;
    providing a plurality of adapters, wherein each adapter includes
        an input module that receives communications from one of the plurality of interfaces and from an associated service provider, and
        a translator that
            stores information indicating versions of the one interface and the associated service provider,
            receives the communications from the input module, and
            is adapted to convert the communications between the versions of the interface and the associated service provider;
    updating the plugin framework by replacing an old version of an interface, from within the plurality of interfaces, with a new version of the interface;
    accepting, at an adapter associated with the interface, an invocation request from the server to a service provider associated with the interface directed towards the new version of the interface;
    forwarding the invocation request to a translator of the adapter associated with the interface;
    determining that the service provider is adapted to communicate with the old version of the interface;
    converting, by the translator, the invocation request which had been directed towards the new version of the interface, to a converted invocation request directed towards the old version of the interface; and
    transmitting the converted invocation request to the service provider.

2. The method of claim 1, further comprising:
    accepting, at the adapter associated with the interface, a request from the service provider to access a protected resource directed to the old version of the interface; and
    creating a provider object that performs tasks related to the request on behalf of the service provider.

3. The method of claim 2, wherein converting, by that translator, the request which had been directed towards the old version of the particular interface, to a converted request directed towards the new version of the particular interface comprises:
    determining whether the service provider uses a current version of the interface or a legacy version; and
    using the existing service provider when the service provider is determined to use the current interface version; otherwise
    wrapping the existing service provider with an adapter when the service provider is determined to use the legacy version.

4. The method of claim 3, wherein transmitting the converted request to the plugin framework through the new version of the particular interface comprises:
    transmitting the converted request to the wrapped service provider when the service provider is determined to use the legacy version.

5. The method of claim 1, wherein accepting, at a particular adapter associated with a particular interface, a request from a service provider directed towards the old version of the particular interface comprises:
    accepting a request to a security service provider accessible via the plugin framework.

6. The method of claim 5, wherein accepting a request to a security service provider accessible via the plugin framework comprises:
    accepting a request for at least one of: an authentication system, an identity assertion system, an authorization system, and an auditing system.

7. A non-transitory machine readable storage medium having instructions stored thereon that when executed by a processor cause a system to perform the steps comprising:
    provide, at a server, a plugin framework which includes a plurality of interfaces, wherein each interface is associated with a different type of service provider;
    provide a plurality of adapters, wherein each adapter includes
        an input module that receives communications from one of the plurality of interfaces and from an associated service provider, and
        a translator that
            stores information indicating versions of the one interface and associated service provider,
            receives the communications from the input module, and
            is adapted to convert the communications between the versions of the one interface and the associated service provider;
    update the plugin framework including replacing an old version of an interface, from the plurality of interfaces, with a new version of the interface;

accept, at an adapter associated with the interface, an invocation request from the server to a service provider associated with the interface directed towards the new version of the interface;
forward the invocation request to a translator of the adapter associated with the interface;
determine that the service provider is adapted to communicate with the old version of the interface;
convert, by the translator, the invocation request which had been directed towards the new version of the interface, to a converted invocation request directed towards the old version of the interface; and
transmit the converted invocation request to the service provider.

8. The machine readable medium of claim 7, further having instructions that cause a system to:
accept, at the adapter associated with the interface, a request from the service provider to access a protected resource directed to the old version of the interface; and
create a provider object that performs tasks related to the request on behalf of the service provider.

9. The machine readable medium of claim 8, wherein the instructions for causing the system to convert, by that translator, the request which had been directed towards the old version of the particular interface, to a converted request directed towards the new version of the particular interface comprise instructions that cause a system to:
determine whether the service provider uses a current version of the interface or a legacy version; and
use the existing service provider when the service provider is determined to use the current interface version; otherwise
wrap the existing service provider with an adapter when the service provider is determined to use the legacy version.

10. The machine readable medium of claim 9, wherein the instructions for causing the system to transmit the converted request to the plugin framework through the new version of the particular interface comprise instructions that cause a system to:
transmit the converted request to the wrapped service provider when the service provider is determined to use the legacy version.

11. The machine readable medium of claim 7, wherein the instructions for causing the system to accept, at a particular adapter associated with a particular interface, a request from a service provider directed towards the old version of the particular interface comprise instructions that cause a system to:
accept a request to a security service provider accessible via the plugin framework.

12. The machine readable medium of claim 11, wherein the instructions for causing the system to accept a request to a security service provider accessible via the plugin framework comprise instructions for causing the system to:
accept a request to at least one of: an authentication system, an identity assertion system, an authorization system, and an auditing system.

13. A system for translating between different versions of an interface, utilizing a plugin framework in a server, the system comprising:
one or more micro-processors;
a plugin framework which operates on the one or more micro-processors and includes a plurality of interfaces, wherein each interface is associated with a different service provider; and
a plurality of adapters, wherein each adapter includes
an input module that receives communications from one of the plurality of interfaces and from an associated service provider, and
a translator that
stores information indicating versions of the one interface and the associated service provider,
receives the communications from the input module, and
is adapted to convert the communications of the one interface and the associated service provider;
wherein when the plugin framework is updated, an old version of an interface is replaced with a new version of the interface;
wherein each adapter is configured to
accept, at an adapter associated with the interface, an invocation request from the server to a service provider associated with the interface directed towards the new version of the interface,
forward the invocation request to a translator of the adapter associated with the interface,
determine that the service provider associated with the interface is adapted to communicate with the old version of the interface,
convert, by the translator, the invocation request which had been directed towards the new version of the interface to a converted request directed towards the old version of the interface, and
transmit the converted invocation request to the service provider.

14. The system of claim 13, wherein the adapter is further configured to:
accept, at the adapter associated with the interface, a request from the service provider to access a protected resource directed towards the old version of the particular interface; and
create a provider object that performs tasks related to the request on behalf of the service provider.

15. The system of claim 14, wherein the adapter is further configured to:
determine whether the service provider uses a current version of the interface or a legacy version; and
use the existing service provider when the service provider is determined to use the current interface version; otherwise
wrap the existing service provider with an adapter when the service provider is determined to use the legacy version.

16. The system of claim 15, wherein the adapter is further configured to:
transmit the converted request to the wrapped service provider when the service provider is determined to use the legacy version.

17. The method of claim 13, wherein the adapter is further configured to:
accept a request to a security service provider accessible via the plugin framework.

18. The method of claim 17, wherein the adapter is further configured to:
accept a request for at least one of: an authentication system, an identity assertion system, an authorization system, and an auditing system.

* * * * *

UNITED STATES PATENT AND TRADEMARK OFFICE
CERTIFICATE OF CORRECTION

PATENT NO. : 8,661,420 B2  
APPLICATION NO. : 11/195991  
DATED : February 25, 2014  
INVENTOR(S) : Smithline Page 1 of 1

It is certified that error appears in the above-identified patent and that said Letters Patent is hereby corrected as shown below:

In the Claims

In Column 10, line 53, in Claim 17, delete "The method" and insert --The system--, therefor.

In Column 10, line 57, in Claim 18, delete "The method" and insert --The system--, therefor.

Signed and Sealed this  
Seventh Day of July, 2015

Michelle K. Lee  
*Director of the United States Patent and Trademark Office*